US008594372B2

(12) United States Patent
Hsu

(10) Patent No.: US 8,594,372 B2
(45) Date of Patent: Nov. 26, 2013

(54) PORTABLE ELECTRONIC DEVICE AND OPERATION METHOD THEREOF

(75) Inventor: Chih-Kai Hsu, Taipei (TW)

(73) Assignee: Inventec Corporation (TW)

( * ) Notice: Subject to any disclaimer, the term of this patent is extended or adjusted under 35 U.S.C. 154(b) by 359 days.

(21) Appl. No.: 13/052,507

(22) Filed: Mar. 21, 2011

(65) Prior Publication Data

US 2012/0051590 A1 Mar. 1, 2012

(30) Foreign Application Priority Data

Sep. 1, 2010 (TW) .............................. 99129558 A

(51) Int. Cl.
*G06K 9/00* (2006.01)

(52) U.S. Cl.
USPC .......................................................... 382/103

(58) Field of Classification Search
USPC ................. 382/100, 103, 181, 190; 348/169; 235/411; 386/228, 229
See application file for complete search history.

(56) References Cited

U.S. PATENT DOCUMENTS

2003/0071739 A1* 4/2003 Addy et al. ................ 340/686.1
2005/0018834 A1* 1/2005 Furnas ...................... 379/376.02
2005/0195952 A1* 9/2005 Dyer et al. ............... 379/201.01
2005/0219058 A1* 10/2005 Katagiri et al. ............... 340/575
2007/0037610 A1* 2/2007 Logan ........................... 455/574
2008/0117072 A1* 5/2008 Hallbert et al. ............... 340/670
2009/0137286 A1* 5/2009 Luke et al. .................... 455/567
2010/0097227 A1* 4/2010 Kim et al. ..................... 340/575
2010/0225487 A1* 9/2010 Desjardins ................. 340/573.1
2010/0317371 A1* 12/2010 Westerinen et al. ....... 455/456.6
2011/0022443 A1* 1/2011 Partridge et al. ................ 705/10

FOREIGN PATENT DOCUMENTS

TW 201008224 2/2010

* cited by examiner

*Primary Examiner* — Shervin Nakhjavan
(74) *Attorney, Agent, or Firm* — Lowe Hauptman & Ham, LLP

(57) ABSTRACT

An operation method for a portable electronic device is provided. The portable electronic device includes a micro-controller, a ringing module, a g-sensor and an image capturing module. The operation method includes the following steps. When the ringing module is started up at a pre-set time, the g-sensor detects whether the portable electronic device is slanted. If the portable electronic device is slanted, the micro-controller enables the image capturing module to perform human-eye recognition. If human-eye recognition is performed successfully and lasts for a specific period, the micro-controller disables the ringing module.

10 Claims, 2 Drawing Sheets

PORTABLE ELECTRONIC DEVICE AND OPERATION METHOD THEREOF

This application claims the benefit of Taiwan application Serial No. 99129558, filed Sep. 1, 2010, the subject matter of which is incorporated herein by reference.

BACKGROUND OF THE INVENTION

1. Field of the Invention

The invention relates in general to a portable electronic device and an operation method thereof, and more particularly to a portable electronic device with alarm clock function and an operation method thereof.

2. Description of the Related Art

For the convenience of the user, the alarm clock normally provides extra function to wake up the sleepyhead. For example, the alarm clock can be set to ring again 5~10 minutes after the first ring, so that the user can stay in bed for a while. However, since the alarm clock is so convenient, the user may easily turn it off without even opening his/her eyes. Consequently, the user may easily oversleep. Nowadays, there are many complicated alarm clocks available in the market. For example, for the wheel-shape alarm clock that runs here and there after ringing, the user must catch it in order to turn it off. However, such type of alarm clock is an extra cost for those who are used to use mobile phone as the alarm clock.

SUMMARY OF THE INVENTION

Most of the mobile phones are now equipped with a g-sensor and an image capturing module. The invention combines the g-sensor and the image capturing module to provide an alarm clock function which cannot be turned off unless the user gets up and opens his/her eyes, hence saving the user's money which would otherwise be spent for an alarm clock with complicated functions.

The invention is directed to a portable electronic device and an operation method thereof for effectively avoiding the user oversleeping.

According to a first aspect of the present invention, an operation method for a portable electronic device is provided. The portable electronic device includes a micro-controller, a ringing module, a g-sensor and an image capturing module. The operation method includes the following steps. When the ringing module is started up at a pre-set time, the g-sensor detects whether the portable electronic device is slanted. If the portable electronic device is slanted, the micro-controller enables the image capturing module to perform human-eye recognition. If human-eye recognition is performed successfully and lasts for a specific period, the micro-controller disables the ringing module.

According to a second aspect of the present invention, a portable electronic device is provided. The portable electronic device includes a ringing module, a g-sensor, an image capturing module and a micro-controller. The ringing module is started up at a pre-set time. The g-sensor detects whether the portable electronic device is slanted when the ringing module is started up. The micro-controller enables the image capturing module to perform human-eye recognition if the portable electronic device is slanted, and disables the ringing module if human-eye recognition is performed successfully and lasts for a specific period.

The above and other aspects of the invention will become better understood with regard to the following detailed description of the preferred but non-limiting embodiment(s). The following description is made with reference to the accompanying drawings.

DETAILED DESCRIPTION OF THE INVENTION

The invention is related to a portable electronic device and an operation method thereof, which force the user to get up and open his/her eyes when turning off the ringing module, hence effectively avoiding the user oversleeping. Research shows that after the user gets up and sits on the bed from lying on the bed, the user can effectively resume the awake state from the sleeping state if the user can open his/her eyes for a period of time.

Figure 1:
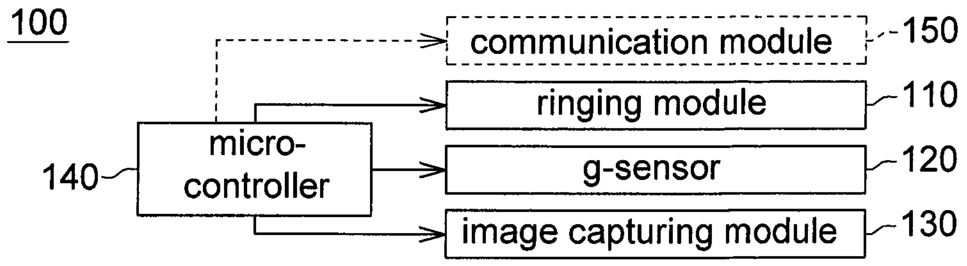
FIG. 1 shows a portable electronic device according to a preferred embodiment of the invention.

Referring to FIG. 1, a portable electronic device according to a preferred embodiment of the invention is shown. The portable electronic device 100 includes a ringing module 110, a g-sensor 120, an image capturing module 130 and a micro-controller 140. The portable electronic device 100, such as a mobile phone, may further include a communication module 150 for performing communication, but the invention is not restricted by such exemplification. The ringing module 110 is started up at a pre-set time. The g-sensor 120 detects whether the portable electronic device 100 is slanted when the ringing module 110 is started up. The micro-controller 140 enables the image capturing module 130 to perform human-eye recognition if the portable electronic device 100 is slanted, and disables the ringing module 110 if human-eye recognition is performed successfully and lasts for a specific period.

Figure 2:
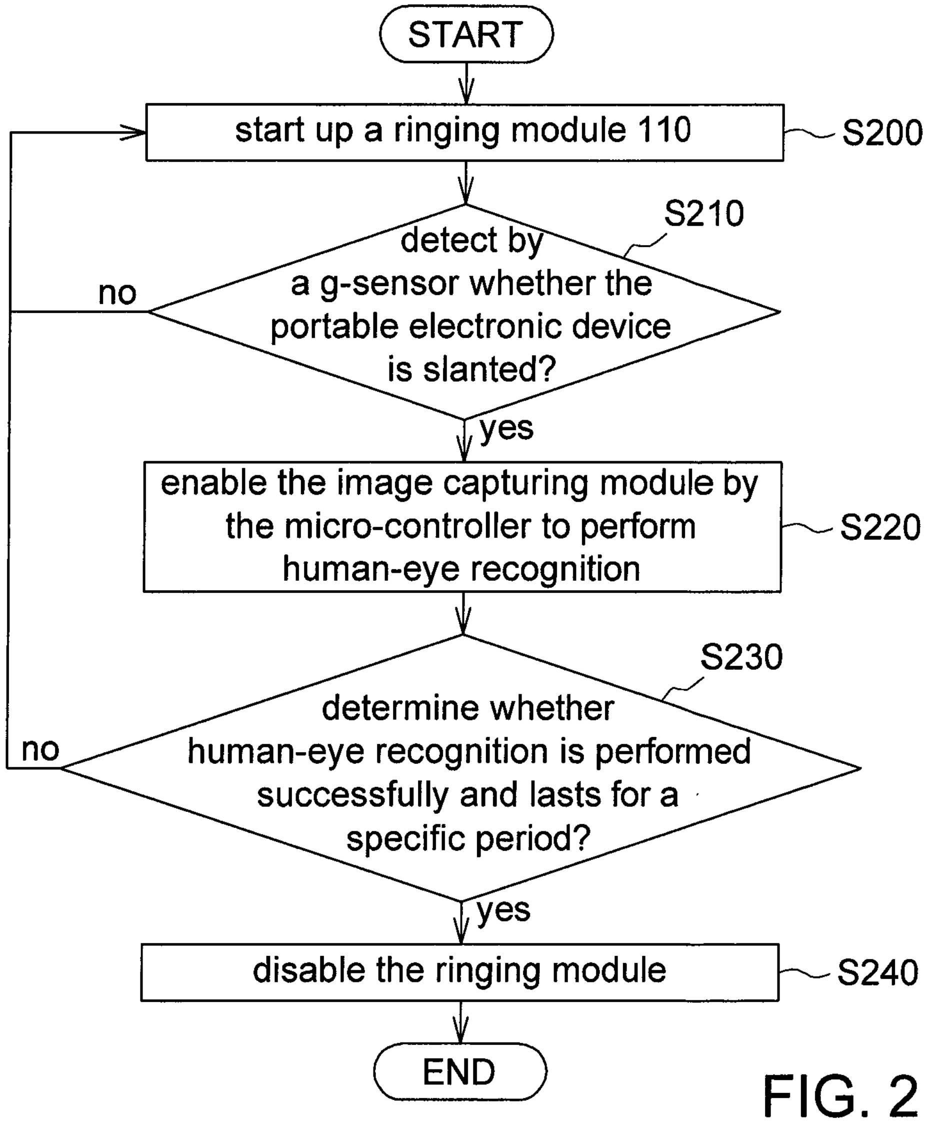
FIG. 2 shows a flowchart of an operation method for a portable electronic device according to a preferred embodiment of the invention.

Referring to FIG. 2, a flowchart of an operation method for a portable electronic device according to a preferred embodiment of the invention is shown. In step S200, the ringing module 110 is started up at a user's pre-set time. In step S210, whether the portable electronic device 100 is slanted is detected by the g-sensor 120 when the ringing module 110 is started up, wherein the portable electronic device 100 must be almost perpendicular to a horizontal plane otherwise the g-sensor 120 cannot determine whether the portable electronic device 100 is slanted.

Figure 3:
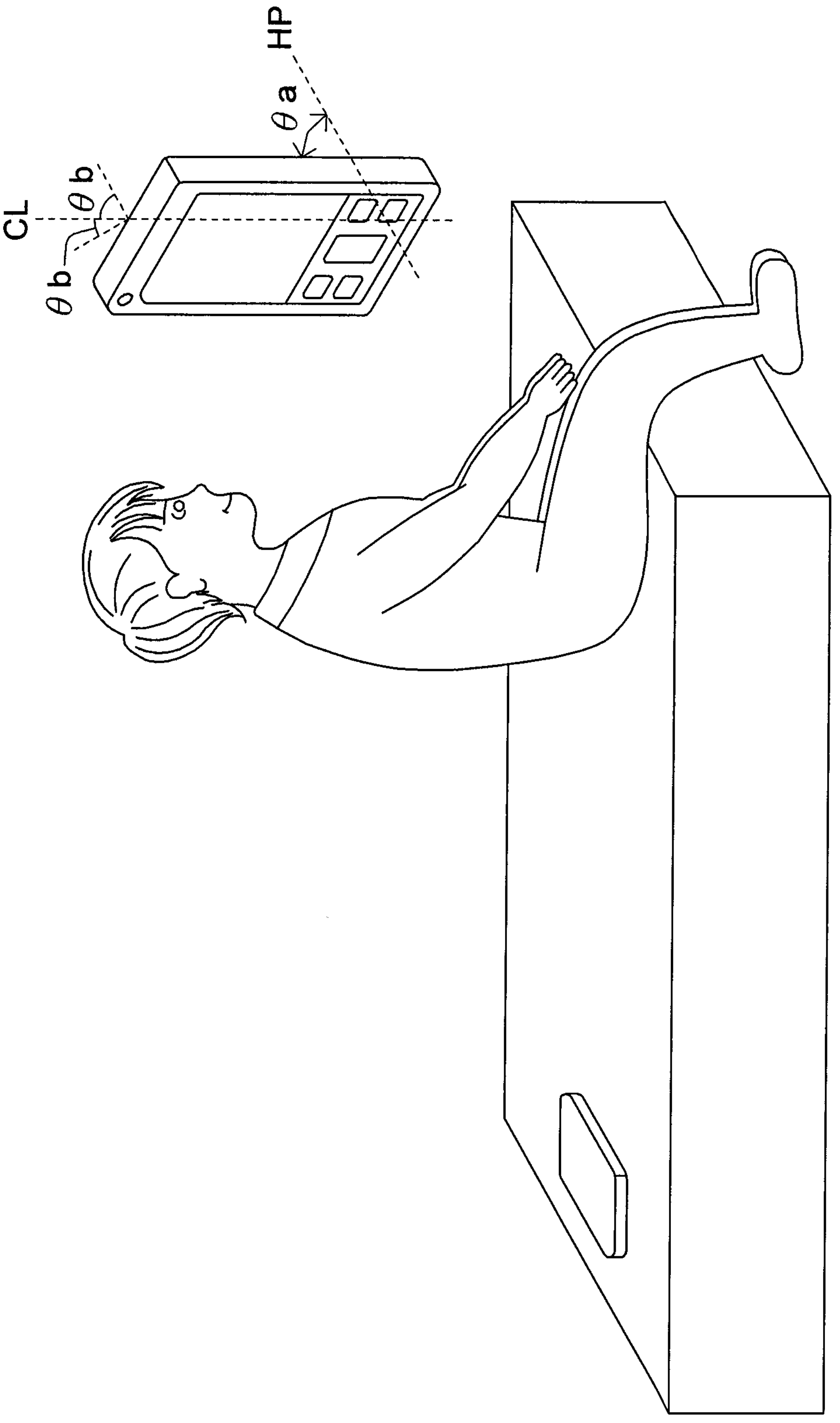
FIG. 3 shows the operation of a portable electronic device according to a preferred embodiment of the invention.

Referring to FIG. 3, the operation of a portable electronic device according to a preferred embodiment of the invention is shown. As indicated in FIG. 3, the g-sensor 120 detects whether the portable electronic device 100 is supported (such as being held at the user's hand) such that the angle $\theta_a$ contained between the portable electronic device 100 and a horizontal plane HP is larger than a first angle. If the portable electronic device 100 is supported such that the angle $\theta_a$ contained between the portable electronic device 100 and a horizontal plane HP is larger than a first angle, the micro-controller 140 determines that the portable electronic device 100 is perpendicular to a horizontal plane, wherein, the first angle such as ranges between 80°~90° for enabling the g-sensor 120 to function.

Furthermore, the g-sensor 120 detects whether the portable electronic device 100 is slanted to a second angle. As indicated in FIG. 3, if the portable electronic device 100 is slanted and the angle $\theta_b$ contained between the portable electronic device 100 and a central line CL reaches a second angle, the micro-controller 140 determines that the portable electronic device 100 is slanted, wherein the second angle such as ranges between 30°~45°. That is, the portable electronic device 100 must be shaken left and right to a certain degree otherwise the micro-controller 140 cannot determine that the portable electronic device 100 is slanted.

If the portable electronic device 100 is not slanted, then the method returns to step S200, the ringing module 110 is started up to wake up the user. To the contrary, if the micro-controller 140 determines that the portable electronic device 100 is slanted, the method proceeds to step S220, the image capturing module 130 is enabled by the micro-controller 140 to perform human-eye recognition. Since the portable electronic device 100 is almost perpendicular to the horizontal plane as indicated in FIG. 3, the user must get up otherwise the image capturing module of the portable electronic device 100 cannot perform human-eye recognition, and is thus more likely to resume the awake state from the sleeping state.

In step S220, human-eye recognition is performed. The process of human-eye recognition is disclosed below. Firstly, the image of the user's facial area is captured by the image capturing module 130, and the eyes are positioned according to the relative geometric relationship of the eyes in the face. Next, the feature area positioned by the micro-controller 140 is further optimized, and the feature area of the eyes is reduced according to the edge detection algorithm, and it is further determined whether the whites and the iris of the eyes can be located within the feature area. In practical application, there is no any specific restriction regarding the technology of human-eye recognition used in step S220, and any technology of human-eye recognition will do as long as the human-eye can be precisely recognized.

In step S230, whether human-eye recognition is performed successfully and lasts for a specific period is determined by the micro-controller 140, wherein, the specific period is not subjected to any specific restriction and can be set to a period (such as 10 seconds) considered by the user as sufficient to resume the awake state. If human-eye recognition is not performed successfully or does not last for a specific period, then the method returns to step S200, the ringing module 110 keeps on ringing to wake up the user. To the contrary, if human-eye recognition is performed successfully and lasts for specific period, then the method proceeds to step S240, the ringing module 110 is disabled by the micro-controller 140. After the specific period, the user already resumes the awake state from the sleeping state.

The portable electronic device and the operation method thereof disclosed in the above embodiments of the invention have many advantages exemplified below:

According to the portable electronic device and the operation method thereof of the invention, the user must get up from the sleeping state, open his/her eyes, and pass human-eye recognition for a specific period otherwise the ringing module of the portable electronic device cannot be turned off. Thus, the user will not oversleep and can effectively resume the awake state from the sleeping state.

In details, if the user can easily turn off the ringing module by lying on the bed and merely turning the portable electronic device to face the user's face horizontally, the user may fall asleep again after turning off the ringing module. Thus, the use of the g-sensor incapacitates facial recognition if the portable electronic device is placed in a horizontal state, and the user is effectively forced to get up from lying on the bed.

In addition, if the user still does not get up and performs facial recognition by merely tilting the portable electronic device, then human-eye recognition may easily fail because the captured image is severely distorted due to the angle of inclination. Thus, the ringing module cannot be turned off unless the user gets up and opens his/her eyes for a specific period.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An operation method applicable to a portable electronic device comprising a micro-controller, a ringing module, a g-sensor and an image capturing module, the operation method comprising:

controlling the g-sensor by the micro-controller to detect whether the portable electronic device is slanted when the ringing module is started up at a pre-set time;

enabling the image capturing module by the micro-controller to perform human-eye recognition if the portable electronic device is slanted; and disabling the ringing module by the micro-controller if human-eye recognition is performed successfully and lasts for a specific period.

2. The operation method according to claim 1, wherein the step of detecting whether the portable electronic device is slanted comprises:

detecting by the g-sensor whether the portable electronic device is supported such that the angle contained between the portable electronic device and a horizontal plane is larger than a first angle; and determining by the micro-controller whether the portable electronic device is perpendicular to the horizontal plane if the portable electronic device is supported such that the angle contained between the portable electronic device and the horizontal plane is larger than the first angle.

3. The operation method according to claim 2, wherein the first angle ranges between 80~90°.

4. The operation method according to claim 2, wherein the step of detecting whether the portable electronic device is slanted further comprises:

detecting by the g-sensor whether the portable electronic device is slanted to a second angle; and determining by the micro-controller that the portable electronic device is slanted if the portable electronic device is slanted to the second angle.

5. The operation method according to claim 4, wherein the second angle ranges between 30°~45°.

6. A portable electronic device, comprising:

a ringing module started up at a pre-set time;

a g-sensor used for detecting whether the portable electronic device is slanted when the ringing module is started up;

an image capturing module; and a micro-controller used for enabling the image capturing module to perform human-eye recognition if the portable electronic device is slanted, and for disabling the ringing module if human-eye recognition is performed successfully and lasts for a specific period.

7. The portable electronic device according to claim 6, wherein the g-sensor detects whether the portable electronic device is supported such that the angle contained between the portable electronic device and a horizontal plane is larger than a first angle, and if the portable electronic device is supported such that the angle contained between the portable electronic device and the horizontal plane is larger than the first angle, the micro-controller determines that the portable electronic device is perpendicular to the horizontal plane.

8. The portable electronic device according to claim 7, wherein the first angle ranges between 80°~90°.

9. The portable electronic device according to claim 7, wherein the g-sensor detects whether the portable electronic device is slanted to a second angle, and if the portable electronic device is slanted to the second angle, the micro-controller determines that the portable electronic device is slanted.

10. The portable electronic device according to claim 9, wherein the second angle ranges between 30°~45°.

* * * * *